(12) United States Patent
Szufnara et al.

(10) Patent No.: US 9,616,329 B2
(45) Date of Patent: Apr. 11, 2017

(54) ADAPTIVE LEARNING SYSTEM FOR VIDEO GAME ENHANCEMENT

(75) Inventors: Ian Szufnara, Vancouver (CA); Fraser Lott, White Rock (CA); Harold Chaput, Montreal (CA)

(73) Assignee: ELECTRONIC ARTS INC., Redwood City, CA (US)

( * ) Notice: Subject to any disclaimer, the term of this patent is extended or adjusted under 35 U.S.C. 154(b) by 1102 days.

(21) Appl. No.: 13/535,445

(22) Filed: Jun. 28, 2012

(65) Prior Publication Data

US 2014/0004950 A1 Jan. 2, 2014

(51) Int. Cl.
*A63F 9/24* (2006.01)
*A63F 13/40* (2014.01)
*A63F 13/30* (2014.01)

(52) U.S. Cl.
CPC .............. *A63F 13/10* (2013.01); *A63F 13/12* (2013.01); *A63F 2300/535* (2013.01); *A63F 2300/6027* (2013.01); *A63F 2300/6045* (2013.01)

(58) Field of Classification Search
CPC .. A63F 13/12; A63F 13/10; A63F 2300/6027; A63F 2300/535; A63F 2300/6045
USPC .................... 463/16, 20, 25, 42, 43
See application file for complete search history.

(56) References Cited

U.S. PATENT DOCUMENTS

| | | | | |
|---|---|---|---|---|
| 5,274,801 A * | 12/1993 | Gordon | ................. | G06N 5/022 |
| 6,253,193 B1 * | 6/2001 | Ginter et al. | ................. | 705/57 |
| 8,100,770 B2 * | 1/2012 | Yamazaki | ............... | A63F 13/06 463/39 |
| 8,142,282 B2 * | 3/2012 | Canessa | ................. | G07F 17/32 463/29 |
| 8,267,764 B1 * | 9/2012 | Aoki et al. | ...................... | 463/16 |
| 8,398,476 B1 * | 3/2013 | Sidhu et al. | .................... | 463/16 |
| 8,540,560 B2 * | 9/2013 | Crowley | ............ | A63B 24/0062 273/317 |
| 8,914,251 B2 * | 12/2014 | Ohta | ........................ | H03M 1/12 702/85 |
| 2008/0268961 A1 * | 10/2008 | Brook | ..................... | A63F 13/12 463/42 |
| 2012/0083330 A1 * | 4/2012 | Ocko | ..................... | A63F 13/63 463/23 |
| 2012/0115580 A1 * | 5/2012 | Hornik et al. | .................. | 463/25 |
| 2012/0220376 A1 * | 8/2012 | Takayama et al. | ............. | 463/42 |
| 2012/0244941 A1 * | 9/2012 | Ostergren et al. | .............. | 463/31 |

* cited by examiner

*Primary Examiner* — Michael Cuff
(74) *Attorney, Agent, or Firm* — Knobbe, Martens, Olson & Bear LLP

(57) ABSTRACT

Techniques are disclosed that can capture sequences of player input in response to situations confronting a player of a video game while playing the video game on a game console. A game engine within the game console may associate an archetype with the captured sequences. The outcomes of the captured sequences are determined with respect to the game situations and a score is applied to the captured sequences based on the outcomes. The captured sequences, the outcomes and the scores are stored in a runtime memory within the game console used to play the video game. Upon completion of the video game, the stored captured sequences, the outcomes and the scores may be downloaded and stored to an external memory associated with the game console. Subsequent video game sessions may load the captured sequences, the outcomes and the scores into the runtime memory to be used in the next session.

24 Claims, 6 Drawing Sheets

SEQUENCE RECORDING DATA FLOW FOR HUMAN PLAYER

ADAPTIVE LEARNING SYSTEM FOR VIDEO GAME ENHANCEMENT

BACKGROUND

Currently, a human player ("player") may a video game such as a basketball game against a computer. The computer may be referred to as a CPU player. As the game is played, the player may enter input via a game controller to cause an animated agent to perform actions. None of the input is recorded, however. The computer merely responds to the input. The CPU player has been programmed with a relatively robust set of default responses from which to apply in reaction to the player input. Over time, the player may come to recognize the CPU player responses and adapt to overcome them. Once this happens, the player does not have the same appreciation for the video game and may stop playing because the challenge of winning is gone.

Thus, current video game systems do not adaptively learn a player's tendencies and moves when faced with a situation while playing a video game. Some sequences of moves are more successful than others. A system that could record and analyze player moves in contextual conjunction with an opponent or a defense to those moves and use the knowledge gained in subsequent games may result in a more interesting and challenging video game experience for players.

In this way, a CPU player may also learn the player's moves and use them in addition to the default set of responses to game situations. This would make it more difficult for the player to anticipate the moves of a CPU player thereby extending the challenge of the video game.

It is with respect to these and other considerations that the present improvements have been needed.

DETAILED DESCRIPTION

Figure 1:
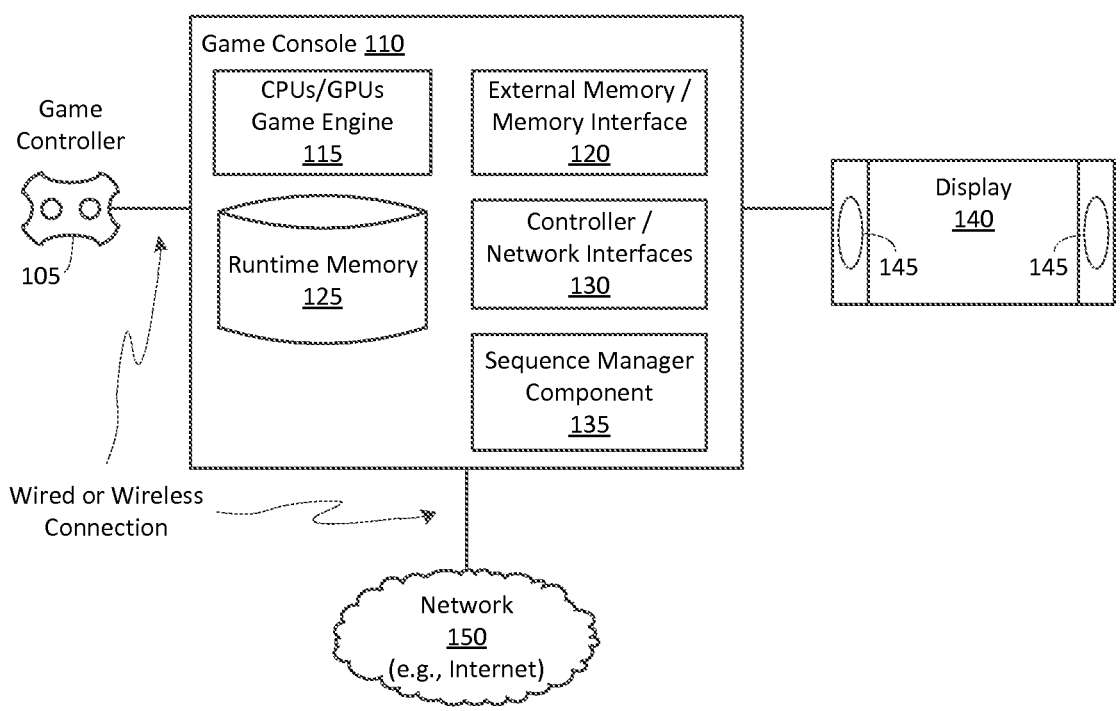
FIG. 1 illustrates one embodiment of a system for enhancing the player experience of a video game.

Techniques are described herein for recording human player game controller inputs that control a simulated agent in a video game and automatically partitioning the game controller inputs into sequences. A simulated agent may be, for example, a boxer, a hockey player, or a basketball player, etc. The simulated agent may be controlled by a human operator (e.g., player) through the manipulation of a game controller input device. The recorded sequences may be stored along with an association to the state of the video game prior to a sequence as well as the resulting state of the video game at the conclusion of the sequence.

Statistics or scores representative of an outcome for each played sequence may be stored in a runtime memory to allow dynamic adaptation of the system based on a player's behavior. These scores may also be stored on a player's game console upon completion of the video game via an external memory device to further customize the player's experience over time. An external memory device is separate from the runtime memory. These stored sequences may also be used by a video game's artificial intelligence that controls a CPU player thus allowing a player to play against a CPU player such that the CPU player can emulate the player's play.

A sequence may represent a recording of human intelligence within a definable context that may be stored as a feature vector. A feature vector may be a set of numerical representations that describe a conditional state. The system may look for a sequence based on a given condition or game state using mathematics. Thus, the system may find and use a recording of human intelligence that may be stored as a set of numerical representations that describe a conditional state.

The embodiments described herein present a machine learning and adaptive pattern recognition system that allows a non-technically-skilled designer or end player to affect the behavior of an agent. In addition, the embodiments allow for the behavior logic of the agent to be represented in a purely data (non-compiled-code) format, making it possible to distribute agent logic (e.g., recorded sequences) as premium downloadable content to the player.

The system does not rely on a predefined set of actions. Instead, it uses pattern recognition to automatically detect and generate game controller sequences that constitute an "action". An action in a basketball game, for example, may be to dribble then shoot. In addition, the sequences can be invoked asynchronously, such that multiple actions can overlap with differing start and end points.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates one embodiment of a system for enhancing the player experience of a video game. In the system illustration, a game controller 105 may be coupled with a game console 110 either wirelessly or via a direct cable connection. The game controller 105 accepts player input from a player of the video game. The game console 110 may include one or more central processing units (CPUs) and/or graphics processing units (GPUs) that generally comprise a game engine 115. The game console 110 may further comprise local memory and interfaces to local memory 120 (e.g., internal memory, SD cards, USB flash drives, etc.), network interface modules 130, and a runtime memory 125. The data in the runtime memory 125 may be accessed by and used by the game engine 115 to execute the video game itself. For example, a video game may be stored on a disk that may be loaded into the game console 110 via one of the external memory device 120 interfaces such as a DVD drive. The data necessary to execute the video game may be copied into the runtime memory 125 along with previously generated player data and player sequences. The previously generated player data and player sequences may be permanently stored on another of the external memory devices 120 such as, for example, an SD card.

A sequence manager 135 component may comprise a software application operative by the game engine 115 that records player sequences as well as allows a CPU player access to player sequences for playback purposes.

The game console 110 may be coupled with a network 150 such as the Internet to permit on-line game playing with similarly situated players using other network connected game consoles. The game console may also be able to upload and download other video game sequences from a remote network storage location. Thus, the player's own sequences to a particular video game may be stored remotely and merged with the sequences of other players to create a robust library of player sequences. The game console 110 may also be coupled with a display 140 having speakers 145 to provide audio and visual output for the video game being played.

Figure 2:
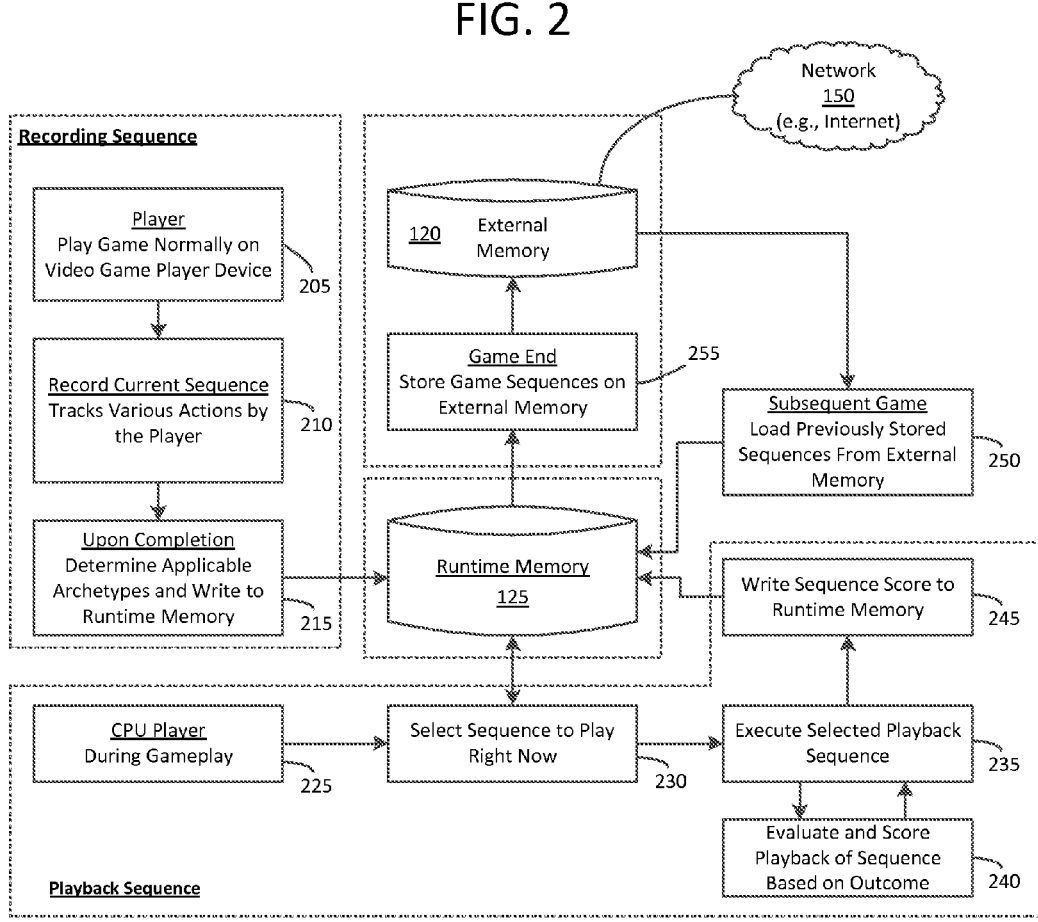
FIG. 2 illustrates one embodiment of a logic flow.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation FIG. 2 illustrates one embodiment of a logic flow 200. The logic flow 200 may be representative of some or all of the operations executed by one or more embodiments described herein. The logic flow 200 may be generally characterized as describing a sequence recording process and a sequence playback process that may occur simultaneously during the play of a video game against a CPU player. The sequence recording process generally describes a process of recording player input to the game controller 105 in response to video game situations. A series of player input manipulations to the game controller 105 may constitute a sequence. The sequence playback process generally describes a process of allowing a CPU player access to the player's recorded sequences. The CPU player may then be permitted to choose one of the recorded sequences to play when confronted with a particular video game situation.

In the illustrated embodiment shown in FIG. 2, the logic flow 200 may begin with a player playing a video game as s/he normally would at block 205. The game may be any type of game (e.g., sports—basketball, boxing, football, etc or adventure—simulated war games, fantasy, etc) in which player input to the game controller 105 may be broken down into sequences. Playing the video game may entail loading a disk containing the code for the video game into a DVD drive on the game console 110 and entering a pre-defined sequence of button pushes on the game controller 105 to set up and launch the video game. The embodiments are not limited to these examples.

The logic flow 200 may record a current sequence at block 210. For example, a current sequence of player actions may be tracked for a period of a few seconds by the sequence manager component 135 within game console 110. A sequence of player actions may result from different types of inputs the player enters via the game controller 105 over a given time period in response to scenarios encountered while playing the video game. The data structure for a sequence may comprise a feature vector, a data payload, and statistical data. The feature vector, for example, may include data pertaining to matching criteria that compares a current game situation to that of the sequence when it was originally recorded. This may include individual elements such as player position, player velocity and an archetype flag. The data payload may include data pertaining to player game controller inputs during the sequence (e.g., left, left, right, shoot) and animation signals used by the game engine to render the movements of the player during playback. The statistical data may include data pertaining to scoring the outcome of the sequence, playback completion and a number of times the sequence has been selected. The embodiments are not limited to these examples. The specifics of how a sequence may be recorded is further described with reference to FIG. 3.

Upon completion of recording a current player sequence, the sequence manager 135 executing within the game console 110 may determine if the current sequence is applicable to any archetypes and may add the recorded sequence to the runtime memory 125 at block 215. An archetype may be thought of as a type of player in a particular game. For example, in basketball there may be four archetypes including point guard, shooting guard, forward, and center. Each of the archetypes has different strengths and weaknesses in the video game. For instance, a point guard may be good at a crossover dribble and drive sequence while a center may be good at a post-up short turnaround jump shot sequence. A forward may be able to perform both sequences but perhaps not to the degree of success of the point guard or the center. Thus, a center would not likely attempt a crossover dribble and drive sequence because his archetype has been characterized as generally not good at that sequence of moves. The success rate (e.g., statistical score) of that move by that archetype would be very low. If the statistical score is below a defined threshold, the sequence may not even be made available to players of that archetype. Player archetypes provide a means for ensuring certain player archetypes (e.g., centers) do not behave like other player archetypes (e.g., guards) and vice versa. If they do, the outcome of such a sequence will likely be poor. The embodiments are not limited to these examples.

Players may acquire individual characteristics through automatic archetype analysis. Players in a given league for a particular video game may be broken up by archetypes. Each player may be assigned an archetype by the front end team, and the archetype may be passed through to gameplay. When a player has finished recording a sequence, the sequence may be assessed as to which of the player archetypes it might apply to best. For example, in a basketball game context, if a sequence has a fancy dribble move and then a step-back jump shot, the sequence may be assessed as being applicable to good dribblers and outside shooters. Thus, the sequence may be assigned one or more archetype flags associated with guards. In this case the sequence may be assigned an archetype flag for a point guard and a shooting guard.

While the player is playing the video game against a CPU player, it is likely that there is a CPU player responding to player input at block 225. Thus, the CPU player may choose a sequence to execute at a given moment at block 230. This sequence may also be stored in the runtime memory 125 and executed at block 235. The specifics of how a sequence may be chosen is further described with reference to FIG. 4. The specifics of how a sequence may be played back is further described with reference to FIG. 5.

Upon execution of a selected sequence from runtime memory 125 for a CPU player, the outcome of the selected played back sequence may be evaluated and scored at block

240. For instance, the sequence may have involved a crossover dribble, a drive toward the basket and a fall away jump shot. The score for this instance of the sequence may be dependent on the outcome. One such outcome may have been that the ball was stolen by a defender. Such an outcome would merit a very low score. A similarly low score may be warranted if the shot were blocked by a defender. On the other hand, if the shot was made, the sequence would merit a high score. The current score of the sequence score may be combined with the overall score of the sequence and written back to the runtime memory 125 to create an updated score for the sequence at block 245. Thus, the more successful a sequence becomes, the higher its score and the more likely it will be selected in future similar situations.

When a CPU player is deciding which sequence to select out of the runtime memory 125 in response to player input, the game engine 115 may determine which CPU player is looking for a sequence match based on the present video game situation and grab that CPU player's archetype value. The game engine 115 only looks at the subset of sequences that have a matching archetype flag set. This may be used going forward to determine if a player is playing the way they should with a given player archetype, which could in turn provide player feedback on how to better use the players on their team.

When a sequence is playing back, the game engine 115 may be tracking outcomes associated with that sequence. For example, if a sequence plays that contains a jump shot in a basketball game, the game engine 115 may then track whether the shot went in, ricocheted for a rebound, or was blocked. Any outcome pertaining to an individual sequence may then provide a small boost or detriment to the sequence's overall score or success rate. Over time, this accumulated score may then move sequences that are successful upwards into the higher difficulty levels of the video game, or downwards to the lower difficulty levels of the video game. The same concept may also be used during game development to determine sequence quality such that sequences that are scoring low may typically be culled from the initial default database of sequences.

Upon completion of a game, sequences that have been created and stored in the runtime memory 125 may be downloaded and stored on an external memory device 120 associated with game console 110 at block 255. For subsequent games, all previously stored player sequences may be loaded back into the runtime memory 125 and made available for use in subsequent sessions of video game play at block 250. The embodiments are not limited to these examples.

Figure 3:
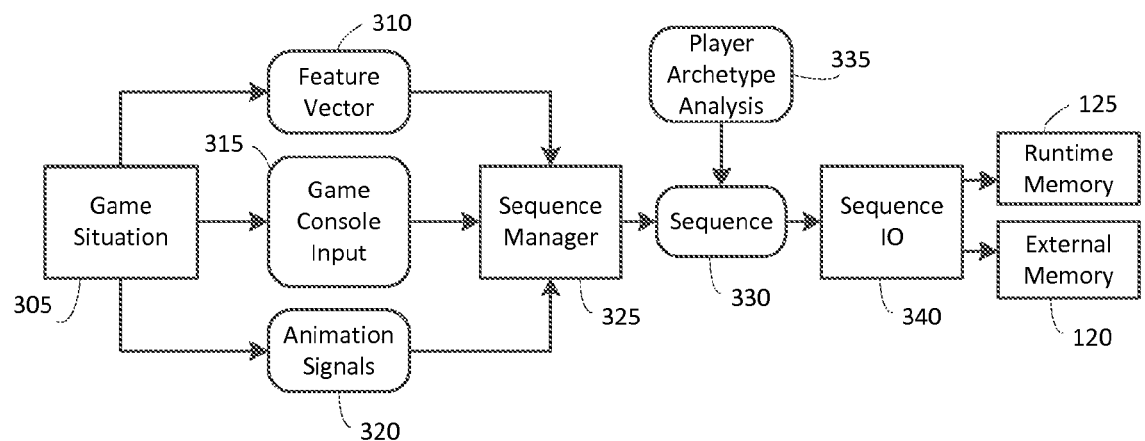
FIG. 3 illustrates one embodiment of a sequence matching logic flow.

FIG. 3 illustrates one embodiment of a sequence recording dataflow for enhancing the player experience of a video game. The logic flow 300 may be representative of some or all of the operations executed by one or more embodiments described herein. The logic flow 300 may be generally characterized as describing the steps for recording human player game controller inputs.

In the illustrated embodiment shown in FIG. 3, the logic flow 300 may begin with a player playing a video game facing a game situation at block 305. The game situation may be from a basketball game, for example. The player may be dribbling down the court and approaching the defense. The game situation may be translated into three data sets including a feature vector 310, game console input 315 and animation signals 320. The feature vector 310 may be a set of numerical representations partitioned into one or more elements that describe a conditional state. The feature vector 310 may include, for instance, data pertaining to the player's current position on the court and velocity vectors indicative of which way the player is moving and how fast, the nearest defender's current position and velocity vectors indicative of which way the defender is moving and how fast, the distance separating the player and the defender, etc. The game console input 315 may be indicative of the buttons the player pushed on the game controller 105 to cause the movement of the player. The animation signals 320 may include data that instructs the game engine 115 how to render the player's movements. The embodiments are not limited to these examples.

The logic flow 300 may receive the feature vector 310, game console input 315, and animation signals 320 at block 325. For example, the sequence manager 135 may receive this information and create a sequence at block 330. A sequence may represent a recording of human intelligence within a definable context that may be stored as a feature vector. The logic flow may perform a player archetype analysis at block 335 to characterize the sequence. For example, the sequence may have included a cross-over dribble move. A cross-over dribble move may be most often associated with a point guard archetype. The cross-over dribble move may also be associated with other guard archetypes as well. Thus, the archetype analysis of the sequence may result in the sequence being most closely associated with a point guard archetype and perhaps a shooting guard archetype. The archetype flags for each of these archetypes may be set for the sequence. The sequence as represented by sequence input/output may be written to the runtime memory 125 and, upon completion of the video game, may also be stored in the external memory 120 of the game console 110. Subsequent player sequences may be similarly recorded to create an expanding set of sequences associated with the video game. As will be described shortly, the recorded sequences may be selected and played back by a CPU player in response to game situations encountered by the CPU player. It should be noted that recorded sequences may be associated with offensive sequences and defensive sequences. That is, the human player input may be recorded in situations when the human player is on offense for a particular video game such as basketball or on defense. The embodiments are not limited to these examples.

Figure 4:
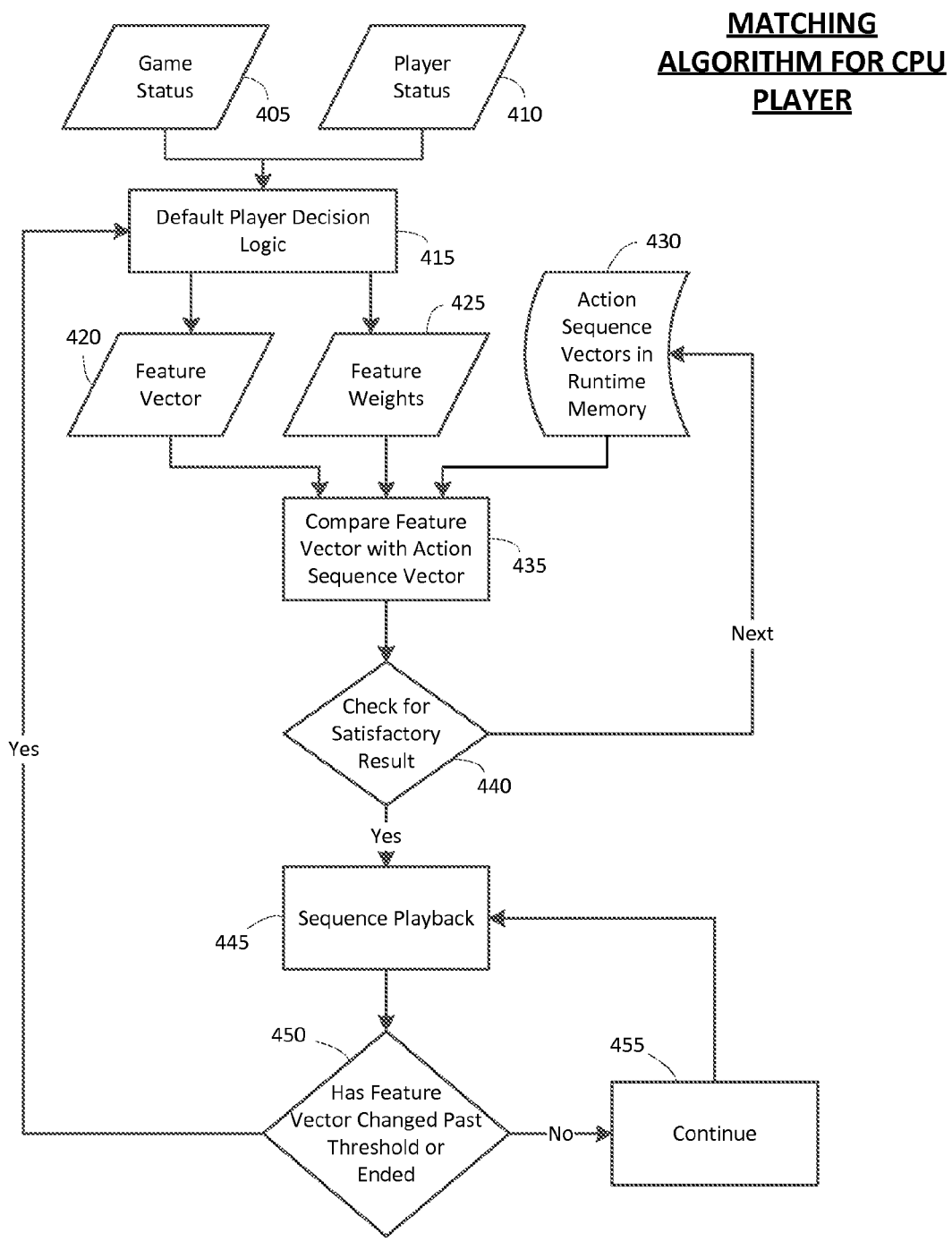
FIG. 4 illustrates one embodiment of a sequence recording logic flow.

FIG. 4 illustrates one embodiment of a logic flow 400 to assist in choosing an appropriate sequence for a CPU player to select from the runtime memory 125. The logic flow 400 may be representative of some or all of the operations executed by one or more embodiments described herein. The logic flow 400 may be generally characterized as describing the steps for finding an appropriate sequence to play.

In the illustrated embodiment shown in FIG. 4, the logic flow 400 may begin with determining a game status 405 and a CPU player status 410 and feeding that data to a set of default player decision logic at block 415. For instance, the game engine 115 may determine a feature vector 420 from a pre-programmed set of sequences based on the game status data 405 and the player status data 410. The game status data 405 may be characterized as the current strategic situation of the video game while the CPU player status data 410 may be characterized as the current physical attributes of the CPU player facing the game situation. A set of feature weights 425 may be applied to the feature vector on an element by element basis. The feature weights 425 may favor certain matching parameters over other matching parameters depending on the game status data 405 and CPU player status data 410. For instance, the distance between the CPU player and the defender may be highly relevant for one sequence but not too relevant for another sequence. The feature weights 425 allow for such characterizations. The logic flow may perform a comparison between the weighted feature vector indicative of the current game situation with a set of action sequence vectors 430 indicative of sequences previously recorded and stored during the playing of previous sessions of the video game as well as the current session of the video game at block 435. For example, each of the previously recorded action sequence vectors 430 includes the same vector elements as the feature vector. Each action sequence vector 430 may be compared on an element by element basis to the weighted feature vector that is indicative of the current game situation. One possible way to implement the comparison is to sum each of the elements of the weighted feature vector and divide by the number of elements to obtain a feature vector number. The same may be done for the action sequence vector 430 to obtain an action sequence number. The difference between the feature vector number and the action sequence number may be obtained. The closer the difference is to zero, the closer the action sequence vector 430 is a match for the weighted feature vector. The embodiments are not limited to these examples.

The logic flow may evaluate the comparison results at block 440. For example, each action sequence vector 430 may be compared to the feature vector in an iterative manner. Upon analysis of all the action sequence vectors 430 the ones that are within a certain matching threshold limit may be retained while all others are discarded. From the remaining set, one may be chosen for playback. The chosen one does not necessarily have to be the action sequence vector 430 having the best matching score, however. The action sequence vector 430 may be randomly chosen from among those that are satisfactory. The embodiments are not limited to these examples.

The logic flow may play back the selected sequence at block 445. The logic flow may then determine whether the game situation as indicated by the current feature vector 420 has ended or deviated from its last instance past a threshold value at block 450. If not, the play back sequence is continued at block 455. Otherwise, control is returned to block 415 to determine a new feature vector 420 based on an updated game status 405 and CPU player status 410. The embodiments are not limited to these examples.

Figure 5:
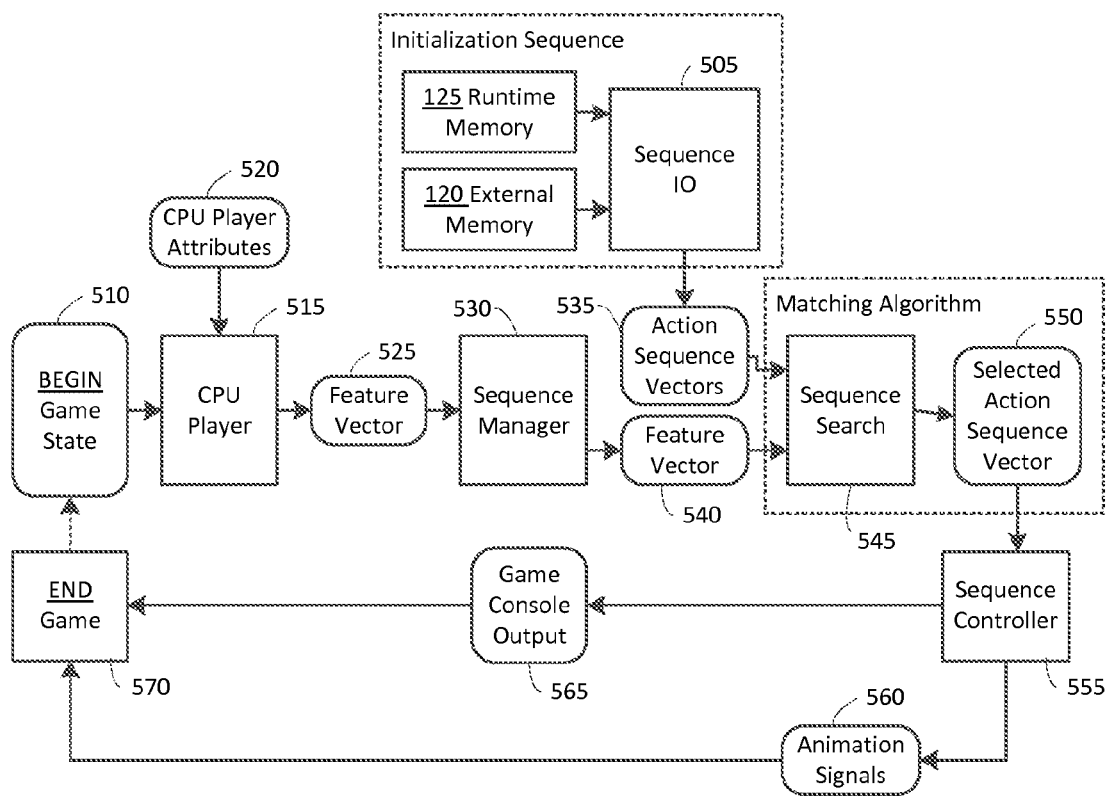
FIG. 5 illustrates one embodiment of a sequence playback logic flow.

FIG. 5 illustrates one embodiment of a sequence playback logic flow 500 for enhancing the player experience of a video game. The logic flow 500 may be representative of some or all of the operations executed by one or more embodiments described herein. The logic flow 500 may be generally characterized as describing the steps for playing back a selected sequence.

In the illustrated embodiment shown in FIG. 5, the logic flow 500 may begin with an initialization sequence that loads the runtime memory with a set of action sequence vectors at block 505. The video game state 510 identifies a CPU player 515 along with all of the CPU player attributes 520. CPU player attributes may include an archetype as well as data indicating the overall skill level of the CPU player as may be based on the level of difficulty of the game as currently played. Blocks 525 through 550 describe the sequence selection and matching process previously described in FIG. 4. The logic flow 500 may utilize a sequence controller to execute the selected sequence to be played back at block 555. The sequence controller may extract from the selected action sequence vector, the game console movements used to create the sequence as well as the animation signals associated with the sequence. The game console movements and the animation signals may then be executed by the game engine 115 to re-create the sequence so as to present the best rendering of the sequence. The embodiments are not limited to these examples.

Using the system architecture of FIG. 1, it is possible to transmit recorded sequences to online teammates or opponents over a network. In one embodiment, received sequences and local sequences on a first game console may be merged and lower scoring sequences (e.g., those having a score below a threshold value) may be discarded. This could morph the runtime memory 125 on a particular game console 110 over time to be the best of all local sequences, as well as all sequences played by opponents. In addition, players may be able to record their own sequences, and then have their team play the recorded sequences as recorded when playing against opponents.

Another use or extension of player recorded sequences may be that analysis may be done (player archetypes being one example) on the player recorded data set. This analysis could then be fed back to the player. In one embodiment, the data could inform the player on how to play towards a more realistic simulation experience. In another embodiment, the analysis may be compared against more expert players as a means of finding out what the player may be doing or not doing in order to succeed.

Thus, FIGS. 1-5 describe a system and method that can capture sequences of player input in response to situations confronting a player of a video game while playing the video game on a game console 110. A game engine 115 within the game console 110 may associate an archetype with the captured sequences. The outcomes of the captured sequences are determined with respect to the game situations and a score is applied to the captured sequences based on the outcomes. The captured sequences, the outcomes and the scores are stored in a runtime memory 125 within the game console 110 used to play the video game. Upon completion of the video game, the stored captured sequences, the outcomes and the scores may be downloaded and stored to an external memory associated with the game console 110. Subsequent video game sessions may load the captured sequences, the outcomes and the scores into the runtime memory to be used in the next session.

In addition, the game engine 115 may allow an automated CPU player to access and select from among the captured sequences in the runtime memory in response to a situation confronting the automated CPU player of the video game. The game engine 115 may then playback a selected sequence and determine an outcome of the played back sequence with respect to the game situation. The outcome may be scored and the score applied to the sequence such that an updated score is written back to the runtime memory 125. The selection of a captured sequence by an automated CPU player may be restricted according to the archetype associated with the selected sequence.

The collection of sequences may be optimized. For example, the external memory may be culled by deleting captured sequences having a score that falls below a threshold value.

In another embodiment, a set of training sequences comprised of a number of captured sequences having a score above a threshold value may be created. The set of training sequences may be stored on a remote network connected storage device. The set of training sequences stored on the remote network connected storage device may be obtained from multiple game consoles and multiple players over a network connection. The set of training sequences may then be downloaded to the runtime memory of a requesting game console 110 to create a higher level of difficulty or challenge for that player.

Often, a player will play against an opponent on-line over a network connection. In order to ensure the game is the same for each player, the runtime memories 125 of each game console 110 are synchronized. Thus, the captured sequences of a first external memory associated with the first game console are loaded into the runtime memory of the second game console. Similarly, the captured sequences of a second external memory associated with the second game console are loaded into the runtime memory of the first game console.

Each player may want to keep the sequences secret, however. This can be done by restricting access to the captured sequences obtained from the second game console and loaded into the runtime memory of the first game console to prevent the first game console from selecting these sequences during gameplay. Similarly, access to the captured sequences obtained from the first game console and loaded into the runtime memory of the second game console may be restricted to prevent the second game console from selecting these sequences during gameplay. The sequences may reside on the other device solely for the purpose of allowing the runtime memory 125 and game engine 110 to recognize the sequence.

Figure 6:
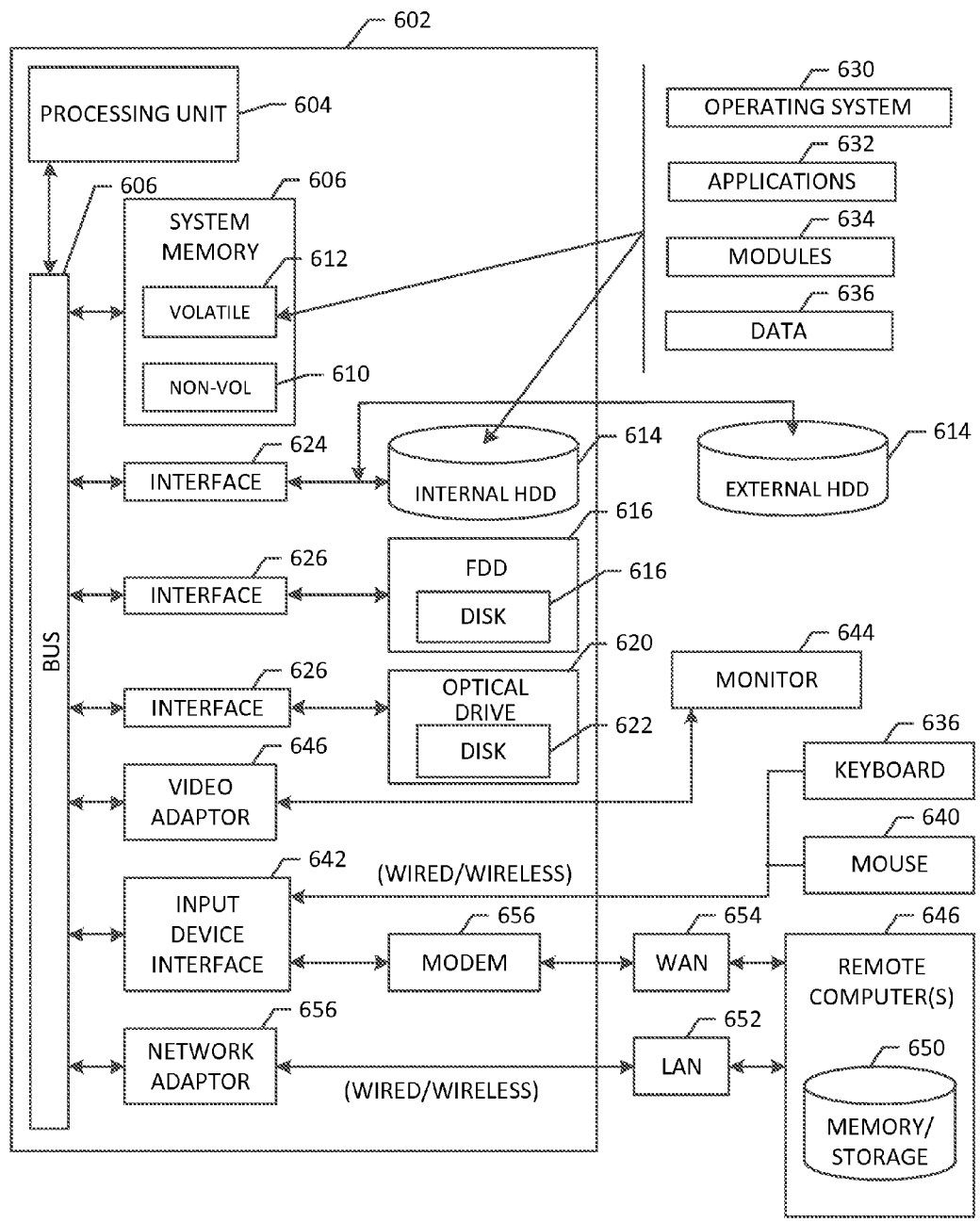
FIG. 6 illustrates one embodiment of a computer architecture.

FIG. 6 illustrates an embodiment of an exemplary computing architecture 600 suitable for implementing various embodiments as previously described. In one embodiment, the computing architecture 600 may comprise or be implemented as part of an electronic device. The embodiments are not limited in this context.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 100.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.15 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.15x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
during runtime execution of a video game application on a computing device, the video game application comprising a virtual environment,
capturing sequences of player input in response to one or more virtual events confronting a player controlled virtual agent within the virtual environment of the video game application;
for individual captured sequences,
determining an outcome of the captured sequence with respect to a virtual event of the one or more virtual events;
applying a score to the captured sequence based, at least in part, on the outcome;
storing the captured sequence, the outcome, and the score in a runtime memory within the computing device used to play the video game application;
in response to a virtual event confronting a computer controlled virtual agent within the virtual environment,
identifying one or more captured sequences based, at least in part, on a game status and computer controlled virtual agent status associated with the virtual event confronting the computer controlled virtual agent;
selecting a captured sequence from the one or more captured sequences based, at least in part, on the scores and outcomes associated with the individual sequences; and
executing the selected captured sequence by the computer controlled virtual agent in response to the virtual event confronting the computer controlled virtual agent within the virtual environment.

2. The method of claim 1 comprising:
determining an outcome of the selected captured sequence with respect to the virtual event of the one or more virtual events;
applying a score to the selected captured sequence based on the outcome;
updating the score of the selected captured sequence in the runtime memory based on the outcome of the played back sequence; and
storing the updated score of the selected captured sequence to external memory upon completion of the video game.

3. The method of claim 2, the selection of the captured sequence for the computer controlled virtual agent restricted according to an archetype associated with the selected sequence and an archetype associated with the computer controlled virtual agent.

4. The method of claim 1, the captured sequence comprising:
a feature vector including data pertaining to player position, player velocity and an archetype flag;
a data payload including data pertaining to player game controller inputs during the sequence and animation signals used by the game engine to render the movements during playback; and
statistical data including data pertaining to score tracking, playback completion and the number of times the sequence has been selected.

5. The method of claim 1 further comprising culling the external memory by deleting captured sequences having a score below a threshold value.

6. The method of claim 1 further comprising creating a set of training sequences comprised of a number of captured sequences having a score above a threshold value.

7. The method of claim 6, further comprising storing the set of training sequences on a remote network connected storage device.

8. The method of claim 7, the set of training sequences stored on the remote network connected storage device obtained from multiple game consoles over a network connection.

9. The method of claim 7, further comprising downloading the set of training sequences from the remote network connected storage device to a runtime memory of a game console.

10. The method of claim 1, further comprising synchronizing a runtime memory of a first game console with a runtime memory of a second game console upon a new instance of a video game to be played across a network between the first and second game consoles.

11. The method of claim 10, the synchronizing comprising:
loading captured sequences of a first external memory associated with the first game console into the runtime memory of the second game console; and
loading captured sequences of a second external memory associated with the second game console into the runtime memory of the first game console.

12. The method of claim 11, further comprising:
restricting access to the captured sequences obtained from the second game console and loaded into the runtime memory of the first game console to prevent the first game console from selecting these sequences during gameplay; and
restricting access to the captured sequences obtained from the first game console and loaded into the runtime memory of the second game console to prevent the second game console from selecting these sequences during gameplay.

13. A system, comprising:
a processor component comprising one or more central processing units (CPUs) and one or more graphics processing units (GPUs);
a runtime memory;
an external memory;
a sequence manager component operative on the processor component to:
capture sequences of player input from a game controller in response to one or more virtual events confronting a player controlled virtual agent within the virtual environment of a video game application;
for individual captured sequences,
determine an outcome of the captured sequence with respect to a virtual event of the one or more virtual events;
apply a score to the captured sequence based, at least in part, on the outcome;

store the captured sequence, the outcome, and the score in the runtime memory while playing the video game application;

in response to a virtual event confronting a computer controlled virtual agent within the virtual environment, identify one or more captured sequences based, at least in part, on a game status and computer controlled virtual agent status associated with the virtual event confronting the computer controlled virtual agent;

select a captured sequence from the one or more captured sequences based, at least in part, on the scores and outcomes associated with the individual sequences; and execute the selected captured sequence by the computer controlled virtual agent in response to the virtual event confronting the computer controlled virtual agent within the virtual environment.

14. The system of claim 13, the sequence manager further operative to:

determine an outcome of the selected captured sequence with respect to the virtual event of the one or more virtual events;

apply a score to the selected captured sequence based on the outcome;

update the score of the selected captured sequence in the runtime memory based on the outcome of the played back sequence; and store the updated score of the selected captured sequence to the external memory upon completion of the video game.

15. The system of claim 14, the selection of the captured sequence for the computer controlled virtual agent restricted according to an archetype associated with the selected sequence and an archetype associated with the computer controlled virtual agent.

16. The system of claim 13, the captured sequence comprising:

a feature vector including data pertaining to player position, player velocity and an archetype flag;

a data payload including data pertaining to player game controller inputs during the sequence and animation signals used by the game engine to render the movements during playback; and statistical data including data pertaining to score tracking, playback completion and the number of times the sequence has been selected.

17. The system of claim 13, the sequence manager further operative to cull the external memory by deleting captured sequences having a score below a threshold value.

18. The system of claim 13, the sequence manager further operative to create a set of training sequences comprised of a number of captured sequences having a score above a threshold value.

19. The system of claim 18, the sequence manager further operative to store the set of training sequences on a remote network connected storage device.

20. The system of claim 19, the set of training sequences stored on the remote network connected storage device obtained from multiple game consoles over a network connection.

21. The system of claim 19, the sequence manager further operative to store download the set of training sequences from the remote network connected storage device to the runtime memory.

22. The system of claim 13, the sequence manager further operative to synchronize a runtime memory of a first game console with a runtime memory of a second game console upon a new instance of a video game to be played across a network between the first and second game consoles.

23. The system of claim 22, the sequence manager further operative to:

load captured sequences of a first external memory associated with the first game console into the runtime memory of the second game console; and load captured sequences of a second external memory associated with the second game console into the runtime memory of the first game console.

24. The system of claim 23, the sequence manager further operative to:

restrict access to the captured sequences obtained from the second game console and loaded into the runtime memory of the first game console to prevent the first game console from selecting these sequences during gameplay; and restrict access to the captured sequences obtained from the first game console and loaded into the runtime memory of the second game console to prevent the second game console from selecting these sequences during gameplay.

* * * * *